(12) United States Patent
Bannon

(10) Patent No.: US 7,416,211 B2
(45) Date of Patent: Aug. 26, 2008

(54) SAFETY SYSTEM FOR AN AUTOMOBILE

(75) Inventor: Sean A. Bannon, Bloomfield, MI (US)

(73) Assignee: Chrysler LLC, Auburn Hills, MI (US)

( * ) Notice: Subject to any disclaimer, the term of this patent is extended or adjusted under 35 U.S.C. 154(b) by 184 days.

(21) Appl. No.: 11/376,523

(22) Filed: Mar. 15, 2006

(65) Prior Publication Data

US 2007/0216144 A1    Sep. 20, 2007

(51) Int. Cl.
*B60R 21/06* (2006.01)
(52) U.S. Cl. ........................ 280/749; 280/753
(58) Field of Classification Search .............. 280/730.2, 280/748, 749, 735, 751, 753
See application file for complete search history.

(56) References Cited

U.S. PATENT DOCUMENTS

| | | | | |
|---|---|---|---|---|
| 3,650,542 A | * | 3/1972 | Shimano et al. | 280/749 |
| 4,673,937 A | * | 6/1987 | Davis | 342/72 |
| 5,707,075 A | * | 1/1998 | Kraft et al. | 280/730.2 |
| 6,053,271 A | * | 4/2000 | Lee | 180/282 |
| 6,097,332 A | * | 8/2000 | Crosby, II | 342/72 |
| 6,135,497 A | * | 10/2000 | Sutherland et al. | 280/749 |
| 6,158,767 A | * | 12/2000 | Sinnhuber | 280/730.2 |
| 6,343,810 B1 | * | 2/2002 | Breed | 280/730.2 |
| 6,375,216 B1 | * | 4/2002 | Eschbach | 280/730.1 |
| 6,467,563 B1 | * | 10/2002 | Ryan et al. | 180/274 |
| 6,517,110 B1 | | 2/2003 | Butters et al. | |
| 6,721,659 B2 | * | 4/2004 | Stopczynski | 701/301 |
| 6,773,031 B2 | * | 8/2004 | Haig | 280/749 |
| 6,893,045 B2 | * | 5/2005 | Inoue et al. | 280/753 |
| 7,125,039 B2 | * | 10/2006 | Bossecker et al. | 280/730.2 |
| 7,260,461 B2 | * | 8/2007 | Rao et al. | 701/45 |
| 7,322,606 B2 | * | 1/2008 | Yamamura et al. | 280/748 |
| 2003/0075906 A1 | * | 4/2003 | Inoue et al. | 280/730.2 |
| 2005/0062267 A1 | | 3/2005 | Recker et al. | |
| 2005/0082797 A1 | | 4/2005 | Welford et al. | |
| 2006/0175814 A1 | * | 8/2006 | Jang et al. | 280/730.2 |
| 2006/0220365 A1 | * | 10/2006 | Kwok | 280/749 |
| 2007/0018442 A1 | * | 1/2007 | Kwok | 280/749 |
| 2007/0152436 A1 | * | 7/2007 | Kwok | 280/749 |

\* cited by examiner

*Primary Examiner*—Christopher Ellis
*Assistant Examiner*—Joseph Rocca
(74) *Attorney, Agent, or Firm*—Ralph E. Smith

(57) ABSTRACT

A safety system is provided for an automobile, which includes a plurality of sensors for monitoring a plurality of parameters. The safety system also includes a processor to ascertain an imminent accident. The system further includes one or more parasols that cover one or more day light openings (DLOs) of the automobile when the imminent accident is ascertained.

17 Claims, 5 Drawing Sheets

SAFETY SYSTEM FOR AN AUTOMOBILE

FIELD OF THE INVENTION

The present invention generally relates to automobiles. More particularly, the present invention relates to a safety system for an automobile.

BACKGROUND OF THE INVENTION

Various studies on road accidents provide conclusive evidence that the ejection of an occupant out of an automobile and the protrusion of the occupant's body parts out of the automobile are the major causes of injuries and casualties in road accidents. Generally, in an accident such as a rollover or a collision, the window glasses and windshields of the automobile are shattered. In such a case, there are no barriers that restrain the occupant from being thrown out of the automobile. Further, due to the absence of any barriers, foreign material such as debris may enter the automobile, causing injury to the occupant. In the worst cases, the occupant can be ejected out the automobile due to the impact of the accident, resulting in serious injury and even death.

Various systems exist to prevent the above-mentioned situations. One such system includes a shield that covers the windows of an automobile when the automobile decelerates rapidly. Another system includes a curtain with an inflatable and an uninflatable portion. The inflatable portion covers a significant region of the windows of the automobile during an accident. The uninflatable portion covers the area of the window that is not covered by the inflatable portion. Yet another system includes inflatable airbags at the windows of an automobile. During an accident, the airbags are inflated with gas and cover the windows.

In the light of the foregoing discussion, there is a need for a system for preventing the ejection of an occupant and the protrusion of the occupant's body parts from an automobile during an accident. The system should provide a barrier that protects the occupant from the shattered glass pieces and other debris from outside. It should also prevent the airbags from getting damaged by the shattered glass pieces and other debris. Further, it should provide a safe exit route to the occupant after the accident.

SUMMARY OF THE INVENTION

It is an object of the present invention to ascertain an imminent accident prior to its occurrence.

Another object of the present invention is to provide a system that prevents the ejection of an occupant or the protrusion of the occupant's body out of an automobile during an accident.

Another object of the present invention is to provide a system that protects the occupant from pieces of shattered glasses and debris during an accident.

Another object of the present invention is to provide a system that prevents the airbags at the windows of an automobile from getting damaged from shattered glasses at the windows during an accident.

Yet another object of the present invention is to provide a safe exit route to an occupant through the window after an accident.

The present invention provides a safety system for an automobile. The safety system has a plurality of sensors, a processor, and one or more parasols. The plurality of sensors monitors a plurality of parameters. Based on the plurality of parameters, the processor ascertains an imminent accident, and one or more parasols cover one or more day light openings (DLOs) of the automobile. This prevents an occupant of the automobile from being ejected out of the automobile or from getting hurt by the broken window panes or the debris.

The present invention provides a method for aiding in the safety of an occupant in an automobile. The method includes monitoring a plurality of parameters. Thereafter, based on the plurality of parameters, an imminent accident is ascertained, and one or more DLOs of the automobile are covered by one or more parasols.

BRIEF DESCRIPTION OF THE DRAWINGS

The various embodiments of the invention will hereinafter be described in conjunction with the appended drawings, provided to illustrate and not to limit the invention, wherein like designations denote like elements, and in which.

DETAILED DESCRIPTION OF THE VARIOUS EMBODIMENTS

The present invention describes a safety system for an automobile and a method for aiding in the safety of an occupant in the automobile. The safety system includes a plurality of sensors, a processor, and one or more parasols. The plurality of sensors monitors a plurality of parameters. Based on the plurality of parameters, the processor ascertains an imminent accident, and one or more parasols cover one or more day light openings (DLOs) of the automobile.

Figure 1:
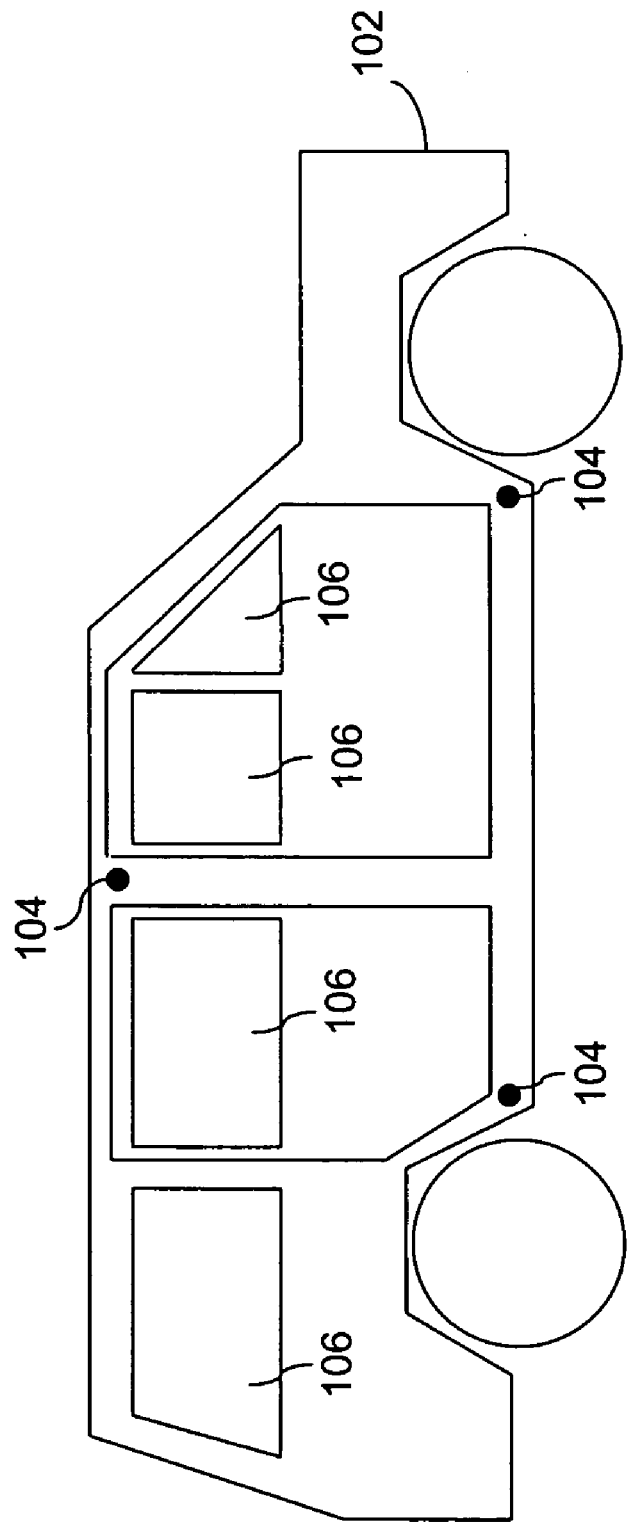
FIG. 1 shows a side view of an automobile, in accordance with an embodiment of the present invention.

FIG. 1 shows a side view of an automobile 102, in accordance with an embodiment of the present invention. Automobile 102 includes a plurality of sensors 104 mounted on its body. Plurality of sensors 104 may be mounted on one or more of the front ends of a side sill, the rear ends of a side sill, and the B-pillar of automobile 102. In various embodiments of the present invention, plurality of sensors 104 may be mounted on the front bumper and the rear bumper of automobile 102. It may be apparent to a person skilled in the art that in addition to the locations mentioned above, plurality of sensors 104 can also be mounted at any other location on automobile 102. Examples of a sensor include, but are not limited to, a radar sensor, a rollover sensor, a laser sensor, and an infrared sensor. Plurality of sensors 104 may monitor a plurality of parameters, such as the speed of automobile 102, the acceleration of automobile 102, and the clearance of automobile 102 from nearby objects such as other automobiles, and so forth. For example, a radar sensor uses an electromagnetic impulse to determine the distance of automobile 102 from the nearby objects. A rollover sensor measures the initial speed, the lateral acceleration, the vertical acceleration, the roll velocity of automobile 102, and so forth. Automobile 102 also includes one or more day light openings (DLOs) 106. A DLO is a transparent opening in an automobile, such as a front window, a rear window, a quarter window and a backlight window, which enables the occupant of an automobile to view the outside from inside the automobile.

Figure 2:
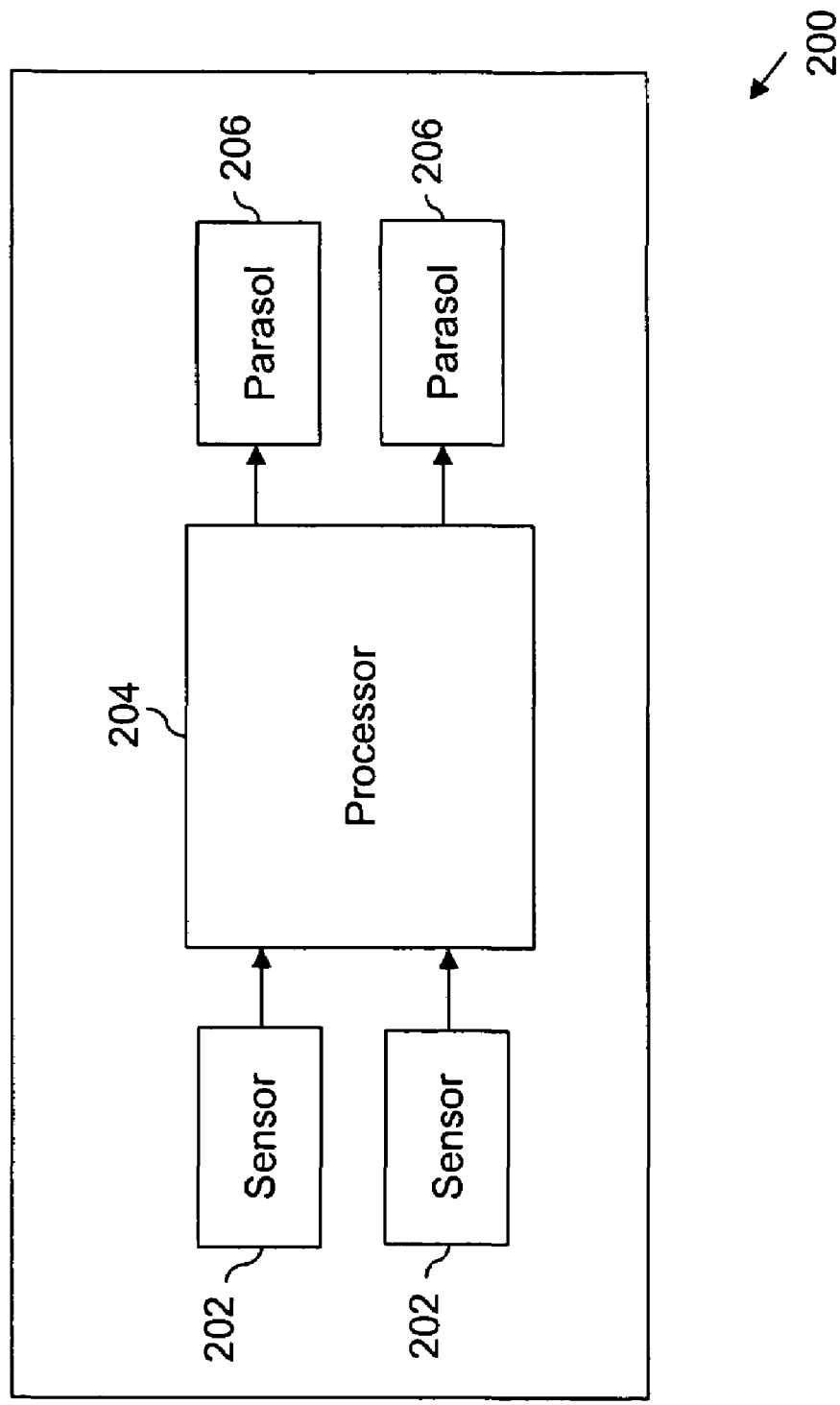
FIG. 2 shows a block diagram of a safety system for the automobile, in accordance with an embodiment of the present invention.

FIG. 2 shows a block diagram of a safety system 200 for automobile 102, in accordance with an embodiment of the present invention. Safety system 200 includes a plurality of sensors 202, a processor 204, and one or more parasols 206. The plurality of sensors 202 monitors a plurality of parameters. The plurality of parameters include, but are not limited to, the speed of automobile 102, the acceleration/deceleration of automobile 102, the clearance of automobile 102 from nearby objects such as other automobiles, and so forth. In an embodiment of the present invention, plurality of sensors 202 monitors the plurality of parameters when the engine of automobile 102 is powered up. Based on the plurality of parameters, processor 204 ascertains an imminent accident such as a front collision, a side collision, a rear collision, an oblique collision, and a rollover of automobile 102. When processor 204 ascertains the imminent accident, one or more parasols 206 cover one or more DLOs 106 of automobile 102. In an embodiment of the present invention, one or more of parasols 206 are made from materials such as nylon fiber, mylar fiber, kevlar fiber, dacron fiber, and carbon fiber.

In an embodiment of the present invention, safety system 200 for automobile 102 further includes an electric motor. The electric motor enables one or more parasols 206 to cover one or more DLOs 106 when processor 204 ascertains the imminent accident. In another embodiment of the present invention, safety system 200 includes one or more airbags at one or more DLOs 106. The one or more airbags are inflated when processor 204 ascertains an imminent accident. In an embodiment of the present invention, one or more parasols 206 prevent the one or more airbags from protruding out of one or more DLOs 106. This prevents the one or more airbags from getting displaced from their positions, thereby providing an adequate cushioning to an occupant during an accident.

In yet another embodiment of the present invention, safety system 200 also includes a plurality of safety devices such as a braking system, a seat belt, and a hood latch system. The plurality of safety devices are activated when processor 204 ascertains an imminent accident. For example, in a side collision of an automobile, its side airbags inflate and thus provides a cushion to the occupant. In yet another embodiment of the present invention, processor 204 can select the safety device to be activated, based on the imminent accident. For example, when a front collision is ascertained, the front airbags of automobile 102 may be inflated but the side airbags may not.

Figure 3:
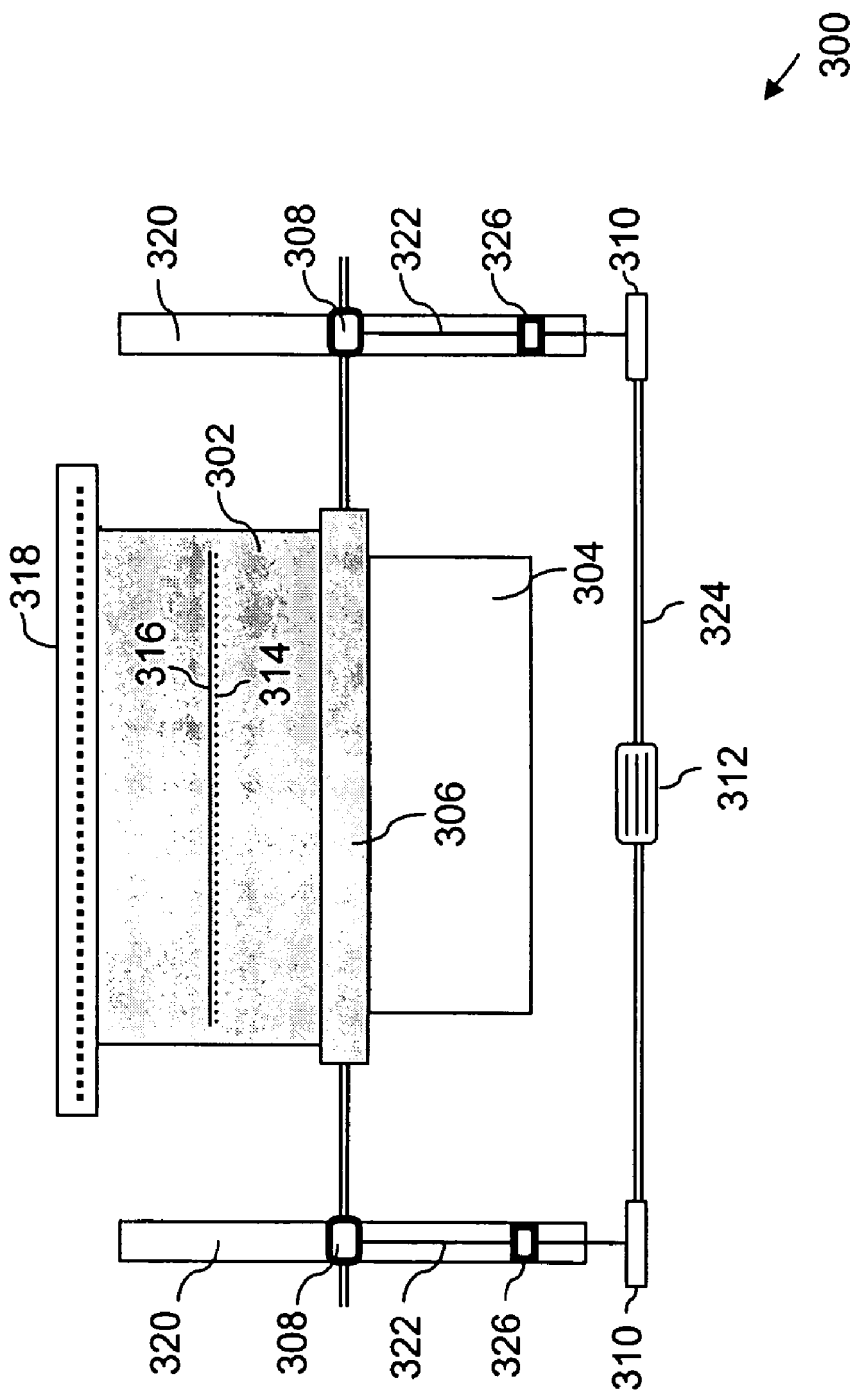
FIG. 3 shows a parasol assembly that enables a parasol to cover a day light opening (DLO), in accordance with an embodiment of the present invention.

FIG. 3 shows a parasol assembly 300 that enables a parasol 302 to cover a day light opening (DLO) 304, in accordance with an embodiment of the present invention. The parasol assembly 300 includes parasol 302, a cylinder 306, rollers 308, drums 310, and an electric motor 312. Parasol 302 includes one or more seams 314 and one or more chords 316. Pulling these one or more chords 316 tears parasol 302 at one or more seams 314. During an accident, parasol 302 covers DLO 304 and the glass covering DLO 304 rolls down. After the accident, an occupant can pull one or more chords 316 to tear parasol 302 at one or more seams 314. This provides the occupant a safe exit from automobile 102, through DLO 304 after the accident.

In an embodiment of the present invention, one end of parasol 302 is fixed to a frame 318 by means of fasteners. The other end of parasol 302 is wrapped around cylinder 306, which has rollers 308 at its ends. Rollers 308 can roll on parallel tracks 320 and are coupled to drums 310 through cables 322. When processor 204 ascertains an imminent accident, electric motor 312 rotates drums 310 through a shaft 324. The rotating drums 310 wrap cables 322 around themselves. Thereby, cylinder 306 moves away from frame 318. This unwraps parasol 302 from cylinder 306. Parasol 302 thereby covers DLO 304. In an embodiment of the present invention, when parasol 302 completely covers DLO 304, latches 326 enable parasol 302 to remain spread over DLO 304.

Figure 4:
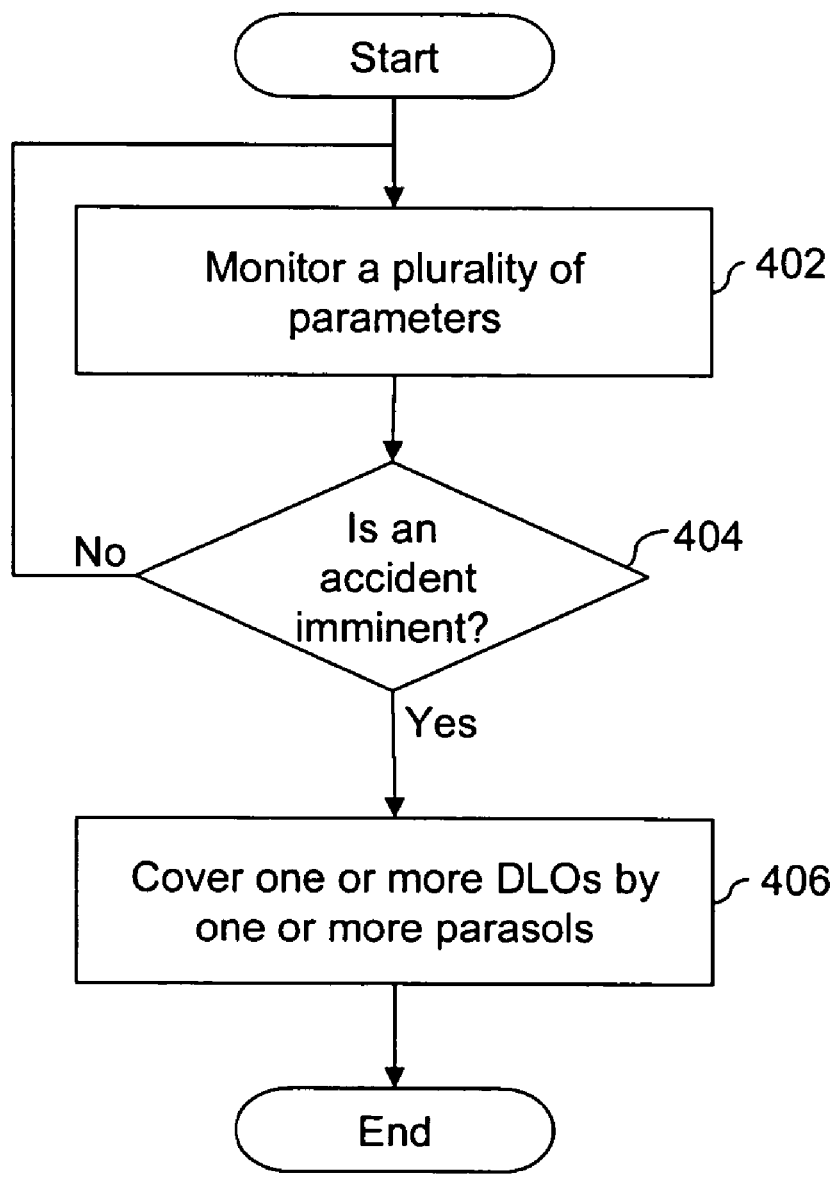
FIG. 4 is a flowchart illustrating a method for aiding in the safety of an occupant in the automobile, in accordance with an embodiment of the present invention.

FIG. 4 is a flowchart illustrating a method for aiding in the safety of an occupant in automobile 102, in accordance with an embodiment of the present invention. At step 402, a plurality of parameters is monitored. In an embodiment of the present invention, plurality of sensors 202 monitors the plurality of parameters. The plurality of parameters may include, but are not limited to, the speed of automobile 102, the acceleration of automobile 102, and the clearance of automobile 102 from nearby objects such as other automobiles. At step 404, an imminent accident is ascertained, based on the plurality of parameters. In an embodiment of the present invention, processor 204 ascertains the imminent accident. If the imminent accident is ascertained, then step 406 is performed. At step 406, one or more DLOs 106 of automobile 102 are covered by one or more parasols 206. If the imminent accident is not ascertained at step 404, then step 402 is performed again.

Figure 5:
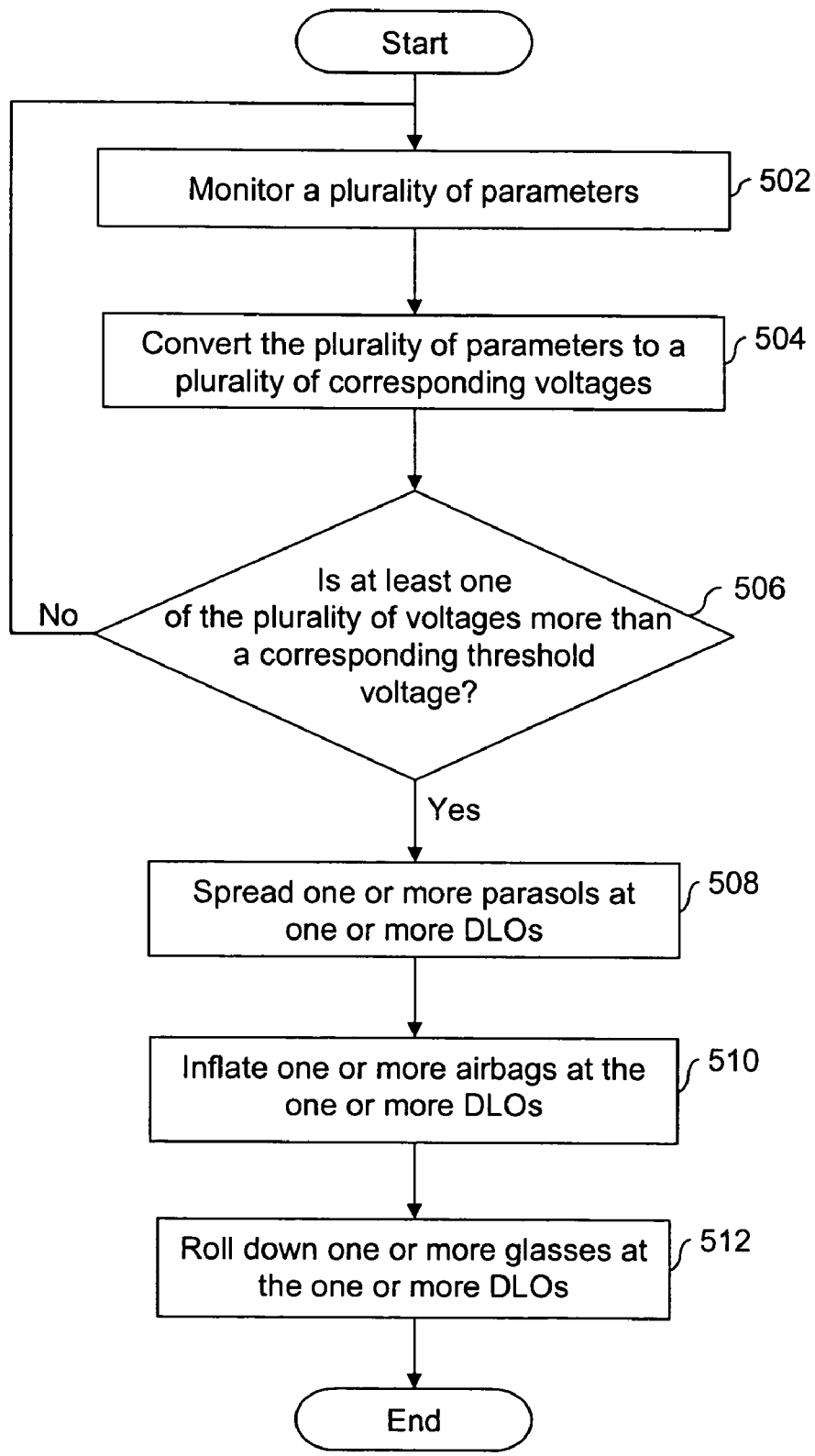
FIG. 5 is a flowchart illustrating a method for aiding in the safety of an occupant in the automobile, in accordance with another embodiment of the present invention.

FIG. 5 is a flowchart illustrating a method for aiding in the safety of an occupant in automobile 102, in accordance with another embodiment of the present invention. At step 502, a plurality of parameters is monitored. The plurality of parameters include, but are not limited to, the speed of automobile 102, the acceleration of automobile 102, and the clearance of automobile 102 from nearby objects such as other automobiles. In an embodiment of the present invention, plurality of sensors 202 monitors the plurality of parameters. At step 504, the values of the plurality of parameters are converted to a plurality of corresponding voltages. In an embodiment of the present invention, plurality of sensors 202 converts the plurality of parameters to the plurality of corresponding voltages. At step 506, it is determined whether at least one of the plurality of voltages is more than a corresponding threshold voltage. In an embodiment of the present invention, processor 204 compares each of the plurality of voltages with the corresponding threshold voltage to ascertain an imminent accident. If at least one of the plurality of voltages is more than the corresponding threshold voltages, then step 508 is performed. At step 508, one or more parasols 206 spread out at one or more DLOs 106. At step 510, one or more airbags are inflated at one or more DLOs 106. At step 512, one or more glasses at one or more DLOs 106 roll down. It will be obvious to one skilled in the art that steps 508, 510 and 512 may occur simultaneously or in a sequence that is different from the one stated above. In an embodiment of the present invention, various safety devices in automobile 102 can be activated when the imminent accident is ascertained. If at least one of the plurality of voltages is not more than the corresponding threshold voltage, then step 502 is performed.

An advantage of the safety system is that it ascertains an accident prior to its occurrence. It covers the DLOs of an automobile, preventing the ejection of an occupant and the protrusion of the occupant's body out of the automobile in the event of an accident. It also protects the occupants from the pieces of shattered glasses and the other debris from outside. Further, it prevents the airbags from being destroyed by the pieces of shattered glasses and other debris during the accident. The safety system also prevents the airbags from bulging out of the windows. Moreover, the safety system provides a safe exit to the occupants after the accident.

While the various embodiments of the invention have been illustrated and described, it will be clear that the invention is not limited only to these embodiments. Numerous modifications, changes, variations, substitutions and equivalents will be apparent to those skilled in the art, without departing from the spirit and scope of the invention, as described in the claims.

What is claimed is:

1. A safety system for an automobile, the safety system comprising:
   a. a plurality of sensors, the plurality of sensors monitoring a plurality of parameters;
   b. a processor, the processor ascertaining an imminent accident based on the plurality of parameters;
   c. one or more parasols, the one or more parasols completely covering one or more day light openings (DLOs) of the automobile when the processor ascertains the imminent accident and wherein the one or more parasols comprises:
      i) one or more seams at the one or more parasols; and
      ii) one or more chords attached to the one or more seams, wherein the one or more chords tear the one or more parasols at the one or more seams; and
   d. one or more glasses being rolled down when the processor ascertains the imminent accident.

2. The safety system of claim 1, wherein the plurality of sensors are selected from the group comprising a radar sensor, a rollover sensor, a laser sensor and an infra-red sensor.

3. The safety system of claim 1, wherein the one or more parasols is made from a material selected from the group comprising nylon fiber, mylar fiber, kevlar fiber, dacron fiber and carbon fiber.

4. The safety system of claim 1, wherein the one or more DLOs is at least one of a front-window, a rear-window, and a quarter-window of the automobile.

5. The safety system of claim 1 further comprising one or more airbags at the one or more DLOs, wherein the one or more airbags are inflated when the processor ascertains the imminent accident.

6. The safety system of claim 5, wherein the one or more parasols prevents the one or more airbags to protrude out of the one or more DLOs.

7. The safety system of claim 1 further comprising an electric motor for enabling the one or more parasols to cover the one or more DLOs.

8. The safety system of claim 1 further comprising a plurality of latches for enabling the one or more parasols to remain fixed at the one or more DLOs.

9. The safety system of claim 1 further comprising a plurality of safety devices, wherein the plurality of safety devices is activated when the processor ascertains the imminent accident.

10. The safety system of claim 1, wherein the imminent accident is at least one of a front-collision, a side-collision, a rear-collision, an oblique-collision and a rollover of the automobile.

11. A safety system for an automobile, the safety system comprising:
    a. a plurality of sensors, the plurality of sensors monitoring a plurality of parameters;
    b. a processor, the processor ascertaining an imminent accident based on the plurality of parameters; and
    c. one or more parasols, the one or more parasols covering one or more day light openings (DLOs) of the automobile when the processor ascertains the imminent accident, wherein the one or more parasols comprises:
       one or more seams at the one or more parasols; and
       one or more chords attached to the one or more seams, wherein the one or more chords tear the one or more parasols at the one or more seams.

12. A method for aiding in safety of an occupant in an automobile, the method comprising:
    a. monitoring a plurality of parameters;
    b. ascertaining an imminent accident based on the plurality of parameters;
    c. completely covering one or more day light openings (DLOs) by one or more parasols when the imminent accident is ascertained and wherein the one or more parasols comprises:
       i) one or more seams at the one or more parasols; and
       ii) one or more chords attached to the one or more seams, wherein the one or more chords tear the one or more parasols at the one or more seams; and
    d. rolling down one or more glasses at the one or more DLOs when the imminent accident is ascertained.

13. The method for claim 12, wherein monitoring the plurality of parameters comprises converting values of the plurality of parameters to a plurality of corresponding voltages.

14. The method for claim 13, wherein ascertaining the imminent accident comprises comparing the plurality of voltages with a plurality of corresponding threshold voltages.

15. The method for claim 13, wherein covering the one or more DLOs comprises spreading the one or more parasols at the one or more DLOs when at least one of the plurality of voltages is more than a plurality of corresponding threshold voltages.

16. The method for claim 12 further comprising inflating one or more airbags at the one or more DLOs when the imminent accident is ascertained.

17. The method of claim 12 further comprising activating a plurality of safety devices when the imminent accident is ascertained.

* * * * *